United States Patent [19]

Johnson

[11] Patent Number: 4,679,804
[45] Date of Patent: Jul. 14, 1987

[54] CONVERTIBLE AUTO RESTRAINER SEAT (CAR SET)

[76] Inventor: Conner Johnson, 3317-B Pepper Tree Cir., Decatur, Ga. 30034

[21] Appl. No.: 781,798

[22] Filed: Sep. 30, 1985

[51] Int. Cl.⁴ .............................................. B62B 7/12
[52] U.S. Cl. ...................................... 280/30; 280/643; 280/648
[58] Field of Search ......................... 280/30, 643, 648; 297/250, 184

[56] References Cited

U.S. PATENT DOCUMENTS

| | | | |
|---|---|---|---|
| 2,482,827 | 9/1949 | Black | 280/30 |
| 2,625,407 | 1/1953 | Varner | 280/643 |
| 2,670,216 | 2/1954 | Leonard | 280/643 |
| 3,709,558 | 1/1973 | Jakob | 297/250 |
| 3,944,241 | 3/1976 | Epelbaum | 280/30 |

Primary Examiner—John J. Love
Assistant Examiner—Richard Camby
Attorney, Agent, or Firm—Newton, Hopkins & Ormsby

[57] ABSTRACT

A convertible car seat/stroller with separately pivotable front and rear sets of legs is disclosed. The seat back has a removable panel that may be secured above the seat to form a visor. When in the collapsed car seat form the legs fit neatly under the seat bottom with the visor stored in the seat back.

8 Claims, 4 Drawing Figures

CONVERTIBLE AUTO RESTRAINER SEAT (CAR SET)

SUMMARY OF INVENTION

The convertable auto restrainer seat (C.A.R. seat) is constructed with two sets of folding legs (front and rear). Each set of legs is equipped with two sets of wheels placed apart to allow stability. There is also a detachable flap on the back of the seat that may be removed and repositioned on the top of the seat to form a visor. The C.A.R. seat is also constructed with a telescoping push bar. The seat is equipped with two loops at the base of its posterior to allow the seat to be easily anchored by conventional seat belts. The seat is designed so that it will not easily slide when properly anchored.

BRIEF DESCRIPTION OF VIEWS

All views except #3 are drawn on a scale of 3" to 1'. View #3 is drawn on a scale of 2.5" to 1'.

Diagrams #1, 2, and 4 depict the invention in it's compacted state.

Diagram #1 shows the side view of the seat.
Diagram #2 shows the back view of the seat.
Diagram #3 shows the side view of the fully extended seat.
Diagram #4 shows a view of the bottom of the seat.

DETAILED DESCRIPTION OF VIEWS

Figure 1:
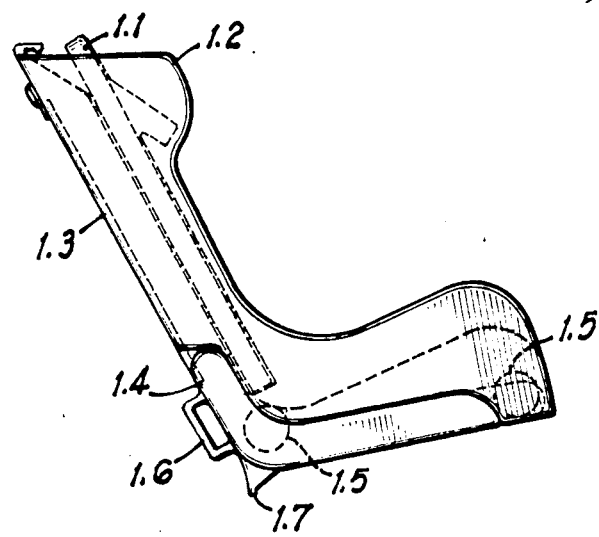
Figure 2:
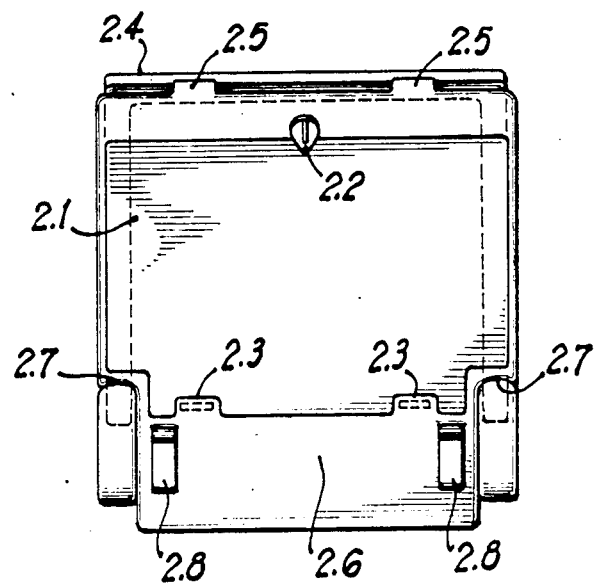
Figure 3:
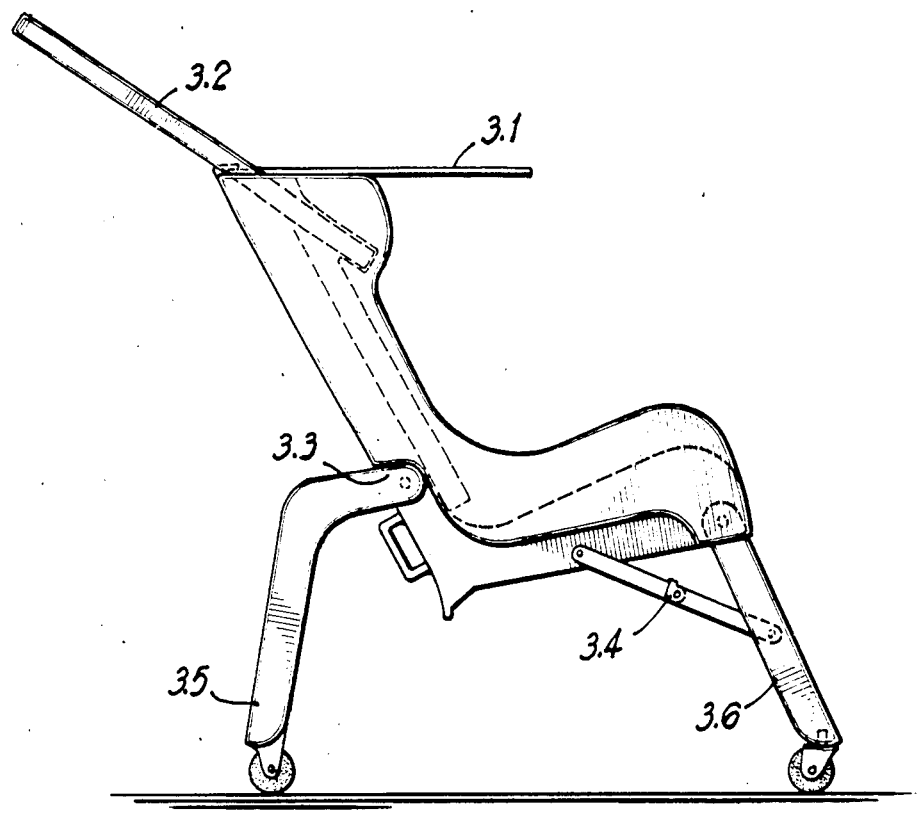
Figure 4:
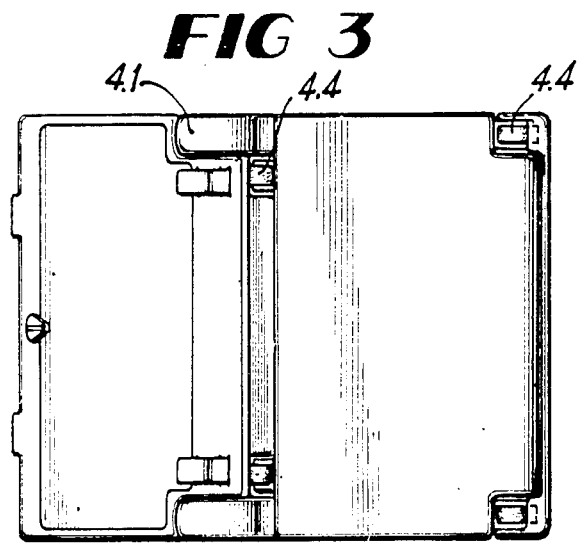

A. Diagram #1 is a side view of the C.A.R. seat.
  A-1. The telescoping push bar (1.1) is extended by pulling it at an angle. Once extended, the bar is held snugly in place by a locking mechanism. The sheathe which houses the bar is located within the seat's shoulder (1.2).
  A-2. The shoulder is angled so that when the back panel (1.3) is attached to the top of the seat it will form a visor that will be parallel to the horizon (see paragraph B-1).
  A-3. The rear leg assembly (1.4) is shown in it's closed position. The curvature of the leg follows the same angles as the seat which allows it to fold conveniently into the side of the seat. All structural supports are located on the nonvisible side of the leg. The wheels (1.5) of the rear leg assembly fit neatly into the hollow of the armrests of the seat.
  A-4. The seat is held on place by passing the seat-belt through the loops (1.6) at the base of the seat and buckling it.
  A-5. The flange (1.7) located between the rear legs with further retard the forward motion of the seat. This feature takes advantage of the crease that exists between the upper and lower frame of the standard automotive seats.
B. Diagram #2 is a view of the rear of the seat.
  B-1. The back panel (2.1) fits into a recess in the back of the seat. It is held in place by a countersunk toggle (2.2) and two catches (2.3). To remove the panel, rotate the toggle to the right and lift it. The shape of the back panel will allow it to be slid between the sides of the push bar (2.4) and connected to the hooks (2.5) at the top of the seat to form a visor.
  B-2. The two back legs are joined by a cross bar (2.6) which is flush when the legs are closed. The upper portion of the rear legs have rounded edges. The body of the seat is designed to fit around the edge of the legs. The body and the legs fit together in sort of a tongue and groove fashion (2.7). This feature serves two purposes: (a) it allows the body and the legs to fit together as one when the seat is folded and (b) when the legs are opened the groove of the seat stops the legs at a predetermined angle.
  B-3. There are two loops (2.8) on the seat, one is placed on each side of the back of the seat. These loops hold the C.A.R. seat in place (see paragraph A-4).
C. Diagram #3 shows the seat opened up into a stroller.
  C-1. The visor (3.1) is formed when the back panel is attached to the top of the seat (refer to paragraph B-1).
  C-2. The push bar (3.2) has been extended (see paragraph A-1).
  C-3. The front and rear legs (3.5 and 7.6 respectively) are unfolded in the direction of the arrows (see diagram). The rear legs will pivot until the upper shaft of the leg contacts the seat groove (3.3). A folding brace (3.4) is used to stabilize the front leg assembly.
  C-4. The wheels are positioned so they donot protrude when the legs are folded. The dashed lines in the rear leg assembly represent reinforcements which supports the wheels.
D. Diagram #4 is a view of the bottom of the C.A.R. seat with the legs folded.
  D-1. The front leg assembly has a shield (4.2) attached to it. This shield gives the seat its smooth appearance when the legs are folded. The wheels of the front leg assembly are free to pivot. When the front legs are folded the wheels fit into a cavity in the seat (4.3). The cavities are located on each side of the seat between the rear legs (4.1).
  D-2. The dashed rectangles (4.4) represent the approximate position of the wheels of the rear legs.

I claim:

1. A seat for children comprising a seat portion with a a back portion extending generally vertically from one edge thereof, said seat portion having separately pivotable front and rear sets of leg members secured thereto, said members having an operative position for supporting the seat, and a folded position for storage thereof, said back portion having a recess formed in the rear face thereof with a panel releasably secured therein, said back portion also having upper and lower retaining means, said lower retaining means for holding said panel in said recess, and said upper retaining means for supporting said panel in a position above and generally parallel to said seat portion.

2. A seat as defined in claim 1 in which said seat includes handle means and said back portion has a sheath formed therein for selectively receiving said handle means.

3. A seat as defined in claim 1 in which said leg members have wheels secured to the bottom thereof and said seat portion includes cavities formed in the underside thereof for receiving said leg members and wheels when pivoted to the folded position.

4. A seat as defined in claim 3 in which said seat portion also includes a flange projecting outwardly from the back for insertion between the upper and lower seat cushions of an automobile seat to retain the seat thereon.

5. A seat as defined in claim 1 in which belt loops are mounted on both sides of said seat portion for receiving a seat belt.

6. A combination car seat and stroller for children comprising a seat portion with a back portion extending generally vertically from the back edge thereof, said seat portion having separately pivotable front and rear sets of leg members secured thereto with wheels secured to the bottoms of said leg members, said leg members having an extended position with said wheels disposed on the ground for forming a stroller and said seat portion including cavities formed in the bottom thereof for receiving said wheels and leg members when in the folded position, a handle having an operative position secured near the upper edges of said back portion for moving the stroller, a sheath formed in said back portion for selectively and telescopically receiving said handle for storage therein, said back portion having a recess formed in the outer surface thereof with a panel releasably secured therein, said back portion also having upper and lower retaining means, said lower retaining means for holding said panel in said recess and said upper retaining means for supporting said panel in a position above and generally parallel to said seat portion.

7. A combination car seat and stroller as defined in claim 6 in which said seat portion also includes a flange projecting outwardly from the back for insertion between the upper and lower seat cushions of an automobile seat to retain the seat thereon.

8. A combination car seat and stroller as defined in claim 7 in which said seat portion includes belt loops secured to each side thereof for receiving a seat belt.

* * * * *

UNITED STATES PATENT AND TRADEMARK OFFICE
CERTIFICATE OF CORRECTION

PATENT NO. : 4,679,804
DATED : July 14, 1987
INVENTOR(S) : Conner Johnson

It is certified that error appears in the above—identified patent and that said Letters Patent is hereby corrected as shown below:

Please change the title of the patent from "CONVERTIBLE AUTO RESTRAINER SEAT (CAR SET)" to "CONVERTIBLE AUTO RESTRAINER SEAT (CAR SEAT)".

Signed and Sealed this

Seventeenth Day of November, 1987

*Attest:*

DONALD J. QUIGG

*Attesting Officer*     *Commissioner of Patents and Trademarks*